United States Patent
Tsugimura (10) Patent No.: US 8,564,823 B2
(45) Date of Patent: Oct. 22, 2013

(54) SCANNER DEVICE

(75) Inventor: Koichi Tsugimura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 362 days.

(21) Appl. No.: 13/072,536

(22) Filed: Mar. 25, 2011

(65) Prior Publication Data

US 2011/0279873 A1  Nov. 17, 2011

(30) Foreign Application Priority Data

May 13, 2010  (JP) ................................. 2010-111310

(51) Int. Cl.
- G06K 15/00 (2006.01)
- G06K 15/10 (2006.01)
- G06K 7/00 (2006.01)
- H04N 1/46 (2006.01)

(52) U.S. Cl.
USPC .......... 358/1.17; 358/1.15; 358/505; 382/312

(58) Field of Classification Search
USPC .............. 358/505, 504, 524, 1.17, 1.15, 1.16, 358/1.9, 474, 444, 1.13; 359/17; 382/312
See application file for complete search history.

(56) References Cited

U.S. PATENT DOCUMENTS

| | | | |
|---|---|---|---|
| 5,926,550 A | 7/1999 | Davis | |
| 7,812,986 B2 * | 10/2010 | Graham et al. | 358/1.15 |
| 8,050,505 B2 * | 11/2011 | Hirohata et al. | 382/219 |
| 8,208,163 B2 * | 6/2012 | Ohira | 358/1.15 |
| 8,417,966 B1 * | 4/2013 | Mooneyham | 713/189 |
| 2003/0123700 A1 | 7/2003 | Wakao | |
| 2005/0190399 A1 | 9/2005 | Nakaoka et al. | |
| 2008/0012972 A1 | 1/2008 | Hirai | |
| 2008/0037034 A1 | 2/2008 | Ishii | |
| 2008/0154928 A1 * | 6/2008 | Bashyam et al. | 707/101 |
| 2008/0292189 A1 * | 11/2008 | Morimoto et al. | 382/181 |
| 2008/0304751 A1 * | 12/2008 | Hayasaki | 382/195 |

(Continued)

FOREIGN PATENT DOCUMENTS

| | | |
|---|---|---|
| CN | 102077165 A | 5/2011 |
| EP | 0 911 723 A2 | 4/1999 |

(Continued)

OTHER PUBLICATIONS

Extended European Search Report dated Jul. 8, 2011 from EP 11160048.2-2202.
Official Action dated Jun. 25, 2013 received from the Chinese Patent Office in related application 201110084136.1 together with English translation.

*Primary Examiner* — Madelein A Nguyen
(74) *Attorney, Agent, or Firm* — Scully, Scott, Murphy & Presser, PC (57) ABSTRACT

A scanner device may create original data for one or more pages, and calculate a digest value utilizing the original data so as to create document data in an external storage device. If a remaining capacity in an internal storage device is not deficient, the scanner device may write a first type of target partial data in both of the internal storage device and the external storage device. If a second type of target partial data which is partial data of a target of a calculating process for calculating the digest value is stored in both of the internal storage device and the external storage device, the scanner device may perform a calculating process by utilizing the second type of target partial data being stored in the internal storage device.

8 Claims, 5 Drawing Sheets

(56) References Cited

U.S. PATENT DOCUMENTS

2009/0034847 A1* 2/2009 Hirohata et al. ............. 382/190
2010/0088522 A1* 4/2010 Barrus et al. ................ 713/181
2011/0038005 A1 2/2011 Ochiai et al.
2011/0060622 A1* 3/2011 Piersol et al. .................... 705/8
2011/0242617 A1* 10/2011 King et al. ................... 358/474

FOREIGN PATENT DOCUMENTS

| EP | 1 827 004 A2 | 8/2007 |
| JP | 2002-515140 | 5/2002 |
| JP | 2008-141692 | 6/2008 |
| WO | WO 2009/157500 A1 | 12/2009 |

* cited by examiner

SCANNER DEVICE

CROSS-REFERENCE TO RELATED APPLICATION

This application claims priority to Japanese Patent Application No. 2010-111310, filed on May 13, 2010, the contents of which are hereby incorporated by reference into the present application.

TECHNICAL FIELD

The present application discloses a scanner device that creates document data by utilizing original data representing a scan target object.

DESCRIPTION OF RELATED ART

A scanner device creates PDF document data by utilizing scanned paper information. This scanner device creates a hash value from the PDF document data and then creates a timestamp token from the hash value. The scanner device also embeds the timestamp token in the document data so as to create document data with a timestamp.

SUMMARY

The prior art described above does not disclose at all a detailed method for creating a hash value. The present application provides a technology which may quickly calculate a digest value (in the above example, the hash value) even when a memory capacity of an internal storage device of a scanner device is comparatively small.

One technique disclosed in the present application is a scanner device utilizing an external storage device. The scanner device may comprise an internal storage device, an original data creation unit configured to create original data for one or more pages representing a scan target object which has been scanned, and a document data creation unit configured to calculate a digest value utilizing the original data for the one or more pages so as to create document data in the external storage device utilizing the original data for the one or more pages and the digest value. The document data creation unit may comprise a writing process performing unit, a changing unit, and a calculating process performing unit.

The writing process performing unit may be configured to perform, for each of a plurality of partial data constituting original data for one page included in the original data for the one or more pages, a writing process for writing the partial data at least in the external storage device. (A1) If a remaining capacity in the internal storage device is not deficient in the writing process for writing a first type of target partial data which is partial data of a target of the writing process, the writing process performing unit may write the first type of target partial data in both of the internal storage device and the external storage device. (A2) If the remaining capacity in the internal storage device is deficient in the writing process for writing the first type of target partial data, the writing process performing unit may write the first type of target partial data only in the external storage device. The changing unit may be configured to change specific partial data included in the plurality of partial data after a completion of a plurality of writing processes for the plurality of partial data. The writing process for the specific partial data may be performed prior to the writing process for another partial data included in the plurality of partial data. The calculating process performing unit may be configured to sequentially perform a calculating process for calculating the digest value by sequentially utilizing each of the plurality of partial data including the specific partial data which has been changed. (B1) If a second type of target partial data which is partial data of a target of the calculating process is stored in both of the internal storage device and the external storage device, the calculating process performing unit may perform the calculating process by utilizing the second type of target partial data being stored in the internal storage device. (B2) If the second type of target partial data is stored only in the external storage device, the calculating process performing unit may perform the calculating process by utilizing the second type of target partial data being stored in the external storage device.

Note that a control method for realizing the above-described scanner device, a computer program, and a non-transitory computer-readable storage medium storing the computer program stored therein are also new and useful.

EMBODIMENT (System Configuration)

Figure 1:
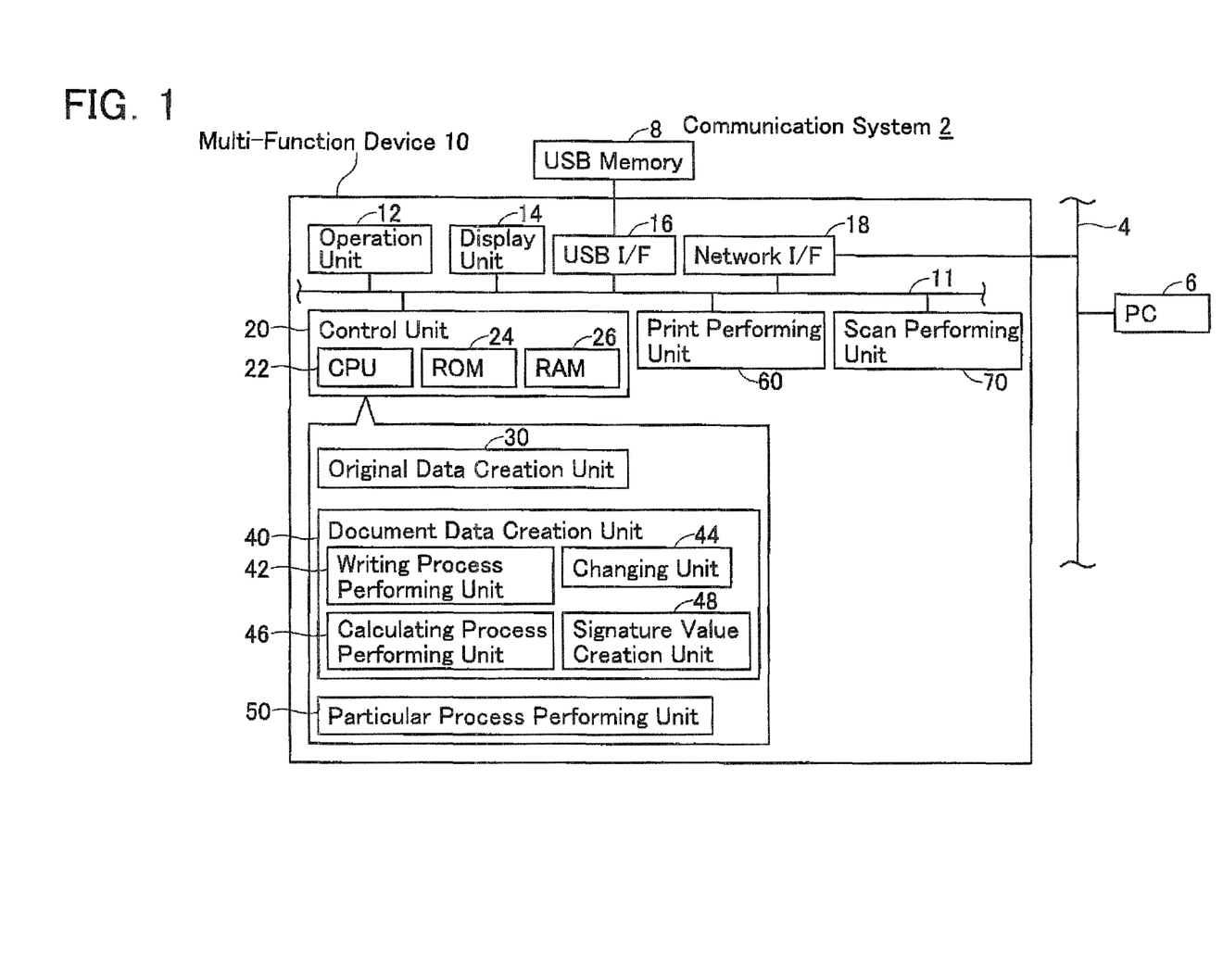
FIG. 1 shows a schematic configuration of a communication system.

Embodiments will be described hereinbelow with reference to the drawings. As shown in FIG. 1, a communication system 2 has a PC 6 and a multi-function device 10, which is a peripheral equipment of the PC 6. The PC 6 and the multi-function device 10 can mutually communicate through a network cable 4.

(Configuration of the Multi-Function Device 10)

The multi-function device 10 is capable of performing multiple functions including a print function and a scan function. The multi-function device 10 has an operation unit 12, a display unit 14, a USB interface 16, a network interface 18, a control unit 20, a print performing unit 60, and a scan performing unit 70. Each of the units 12 to 20, 60, and 70 is connected to a bus 11. The operation unit 12 is constituted by a plurality of keys. A user can input a variety of information into the multi-function device 10 by operating the operation unit 12. The display unit 14 is a display for displaying the variety of information. The USB interface 16 is mounted with a USB memory 8, which is an external memory portable by the user. The network cable 4 is connected to the network interface 18.

The control unit 20 has a CPU 22, a ROM 24, and a RAM 26. The CPU 22 performs a variety of processes according to a program stored in the ROM 24. When the CPU 22 performs the processes in accordance with the program, functions such as an original data creation unit 30, a document data creation unit 40, and a particular process performing unit 50 are realized. Note that the document data creation unit 40 comprises a writing process performing unit 42, a changing unit 44, a calculating process performing unit 46, and a signature value creation unit 48. The RAM 26, a main memory that the CPU 22 can directly access, is for storing a variety of data acquired or created by the control unit 20. Note that the RAM 26 has a memory capacity that is larger than a memory capacity for storing JPEG (Joint Photographic Experts Group) data for one page, which has a maximum data size. The "JPEG data for one page, which has a maximum data size" means JPEG data that is created by the scan performing unit 70 scanning a scan target object for one page at a maximum possible scanning resolution, the scan target object having a maximum scannable height and width. The "height" and "width" of the scan target object will be described hereinbelow in detail. In another embodiment, the RAM 26 may have a memory capacity that is smaller than the memory capacity for storing the JPEG data for one page, which has the maximum data size.

The print performing unit 60 has an inkjet type, a laser type or other type of printing mechanism. Data to be printed ("print data" hereinbelow), which is transmitted from the PC 6, is received by the network interface 18, and then the print performing unit 60 performs a print process according to the received print data. The scan performing unit 70 has a transparent plate, an auto document feeder (ADF), and a scanning mechanism. The scanning mechanism has a plurality of image sensors aligns along a first direction. Each of the image sensors may be a CCD image sensor (Charge Coupled Device Image Sensor) or a CIS (Contact Image Sensor). The scanning mechanism is capable of moving in a second direction that is perpendicular to the direction in which the plurality of image sensors aligns (the first direction). The scanning mechanism can scan the scan target object (e.g., an original document) placed on the transparent plate, by moving the plurality of image sensors in the second direction. Moreover, the scanning mechanism, when in a stationary state thereof, can scan the original document that is fed in the second direction by the auto document feeder. Hereinafter, scanning the scan target object placed on the transparent plate is called "moving scan," and scanning the original document fed by the auto document feeder is called "stationary scan." Further, the scan target object may e.g. be a paper medium. It may be one sheet of the original document, or may be a plurality of sheets of the original document.

(Configuration of a PDF (Portable Document Format) file)

Figure 2:
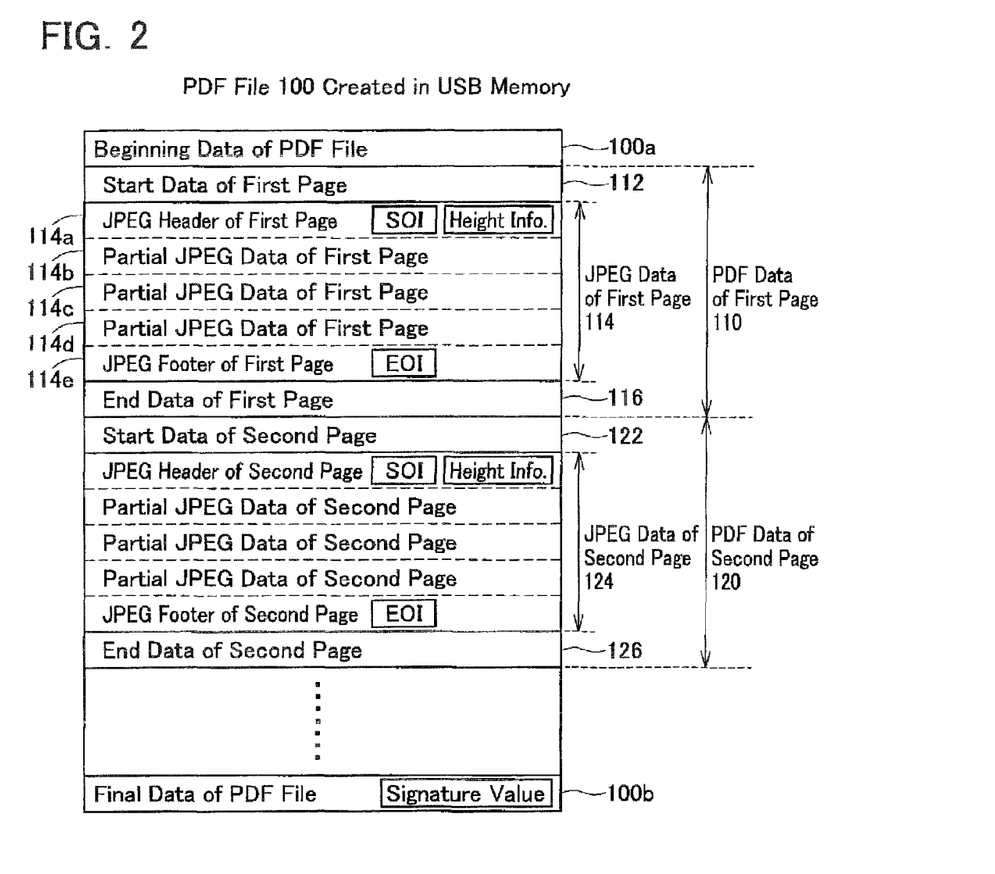
FIG. 2 shows a schematic configuration of a PDF file.

The control unit 20 of the multi-function device 10 creates the JPEG data representing the scanned scan target object, then creates a hash value utilizing the JPEG data, and creates a PDF file within the USB memory 8 by utilizing the JPEG data and the hash value. As shown in FIG. 2, a PDF file 100 includes beginning data 100a, final data 100b, and respective PDF data 110, 120 for each of one or more pages. The beginning data 100a includes a header. The final data 100b includes a footer, a signature value created in S28 shown in FIG. 3 as described hereinbelow, and a certificate preinstalled in the multi-function device 10. The certificate includes certificate information on the certificate, and a public key for decoding the signature value. The certificate information includes information indicating a publisher of the certificate (certificate authority (CA)), information indicating a publication destination (i.e., the multi-function device 10) of the certificate, and information indicating a date of publication of the certificate.

The PDF data 110 of a first page includes start data 112 of the first page, JPEG data 114 of the first page, and end data 116 of the first page. The start data 112 includes a character string that indicates that the JPEG data 114 is written following the start data 112. The end data 116 includes height information and width information of the JPEG data 114 of the first page. Note that "height information of the JPEG data 114" and "width information of the JPEG data 114" correspond to a height and width of an original scan target object of the JPEG data 114, respectively. More specifically, the "height information of the JPEG data 114" represents a number of pixels of the JPEG data 114 along a height direction of the original scan target object of the JPEG data 114. On the other hand, the "width information of the JPEG data 114" represents a number of pixels of the JPEG data 114 along a width direction of the original scan target object of the JPEG data 114. In other words, the greater the height of the original scan target object (and the higher the scanning resolution in the height direction), the larger the height information of the JPEG data 114 (the number of pixels in the height direction). The greater the width of the original scan target object (and the higher the scanning resolution in the width direction), the larger the width information of the JPEG data 114 (the number of pixels in the width direction).

In either the moving scan or the stationary scan, the width direction of the scan target object is the direction in which the plurality of image sensors constituting the scanning mechanism aligns (the first direction). In the case of the moving scan, the height direction of the scan target object is the direction of movement of the scanning mechanism (the second direction). In the case of the stationary scan, the height direction of the scan target object is the direction in which the original document is fed by the auto document feeder (the second direction).

The JPEG data 114 of the first page includes a JPEG header 114a of the first page, a plurality of partial JPEG data 114b to 114d, and a JPEG footer 114e of the first page (i.e., JPEG final data 114e of the first page). The JPEG header 114a includes an SOI (Start of Image) marker and height information. The height information here is same as the height information included in the final data 116 of the first page (i.e., the height information of the JPEG data 114 of the first page). The JPEG footer 114e includes an EOI (End of Image) marker. Each of the partial JPEG data 114b to 114d is the data that is obtained by converting scan data in RGB bitmap format, which is created by scanning. Note that each data between the SOI marker and the EOI marker is often called a "segment." Therefore, each of the partial JPEG data 114b to 114d can also be called "each segment." Note that the PDF data 120 of a second page and respective PDF data of further subsequent pages have the same configuration as the PDF data 110 of the first page, thus explanation thereof will not be repeated.

(Processes Performed by the Multi-Function Device 10)

Next, contents of processes for creating the PDF file 100 within the USB memory 8 will be described. Once the user performs a predetermined operation, the control unit 20 performs a PDF file creation process shown in FIG. 3. The predetermined operation mentioned above includes mounting the USB memory 8 to the USB interface 16, placing the scan target object on the transparent plate or the auto document feeder, designating a desired scanning resolution, and operating a scan performing key included in the operation unit 12.

Figure 3:
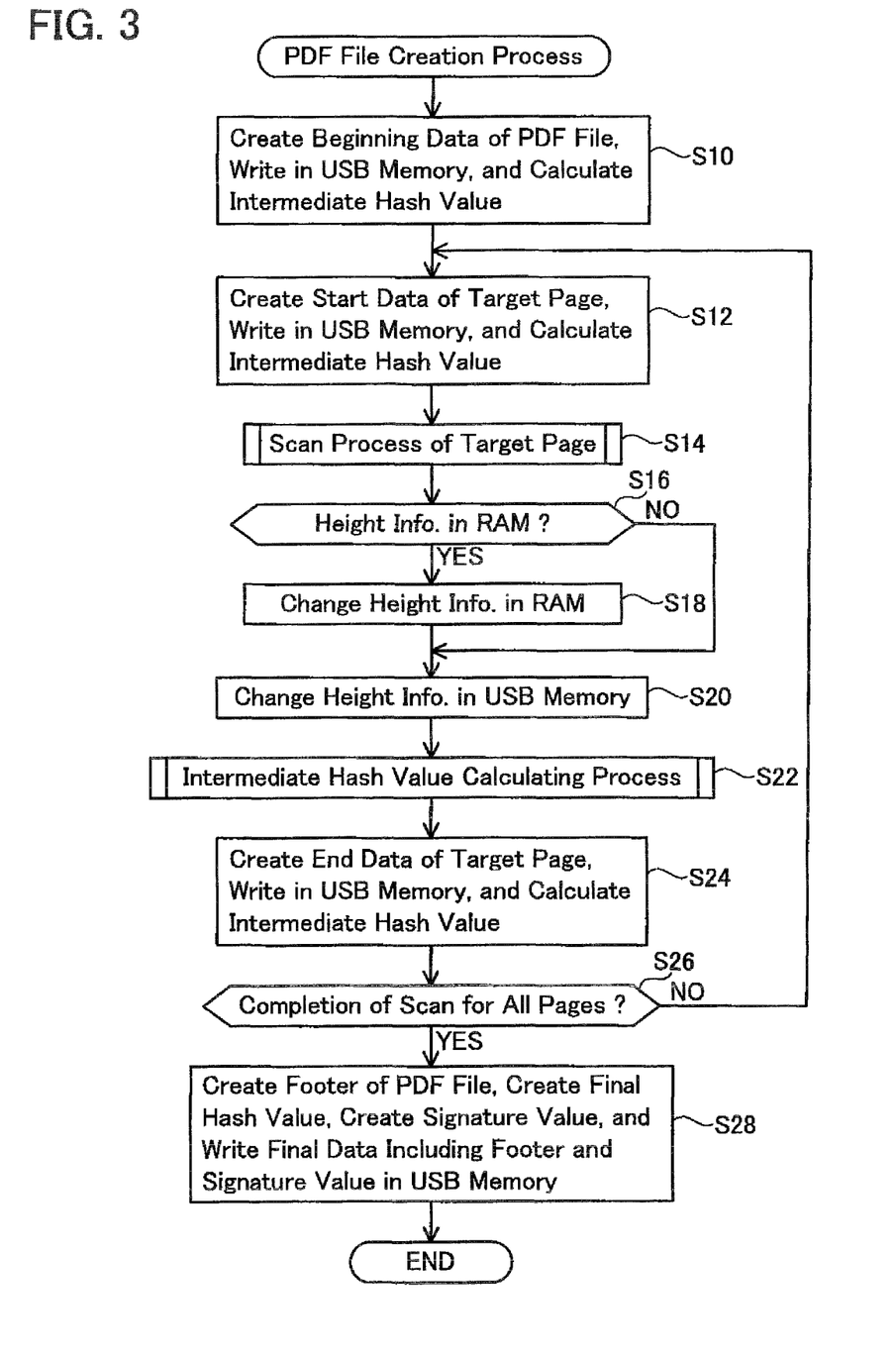
FIG. 3 shows a flowchart of a PDF file creation process.

As shown in S10 in FIG. 3, the document data creation unit 40 (see FIG. 1), firstly creates the beginning data 100a (see FIG. 2) in the RAM 26. Moreover, in S10, the writing process performing unit 42 (see FIG. 1) writes the beginning data 100a, which has been created in the RAM 26, to the USB memory 8. Further, in S10, the calculating process performing unit 46 (see FIG. 1) calculates a hash value by utilizing the beginning data 100a. Note in the present embodiment that the calculating process performing unit 46 utilizes an SHA (Secure Hash Algorithm)-1 as a hash function, but may also utilize MD4, MD5 or other hash functions. In addition, hereinafter, a hash value that is calculated finally in S28 of FIG. 3 is called "final hash value," and each hash value that is calculated in each process prior to the process of S28 in order to create the final hash value is each called "intermediate hash value." Note that the control unit 20 deletes the beginning data 100a from the RAM 26, once the intermediate hash value therefor is calculated in S10.

Next, in S12 the document data creation unit 40 creates the start data of a target page in the RAM 26. In a first S12 (i.e., the process of S12 performed for the first time after S10), the target page is the first page. Therefore, in the first S12 the document data creation unit 40 creates the start data 112 of the first page (see FIG. 2). Note that contents of processes from S12 to S24 are described hereinbelow with an example of a case in which the target page is the first page. In S12, the writing process performing unit 42 further writes the start data 112, which has been created in the RAM 26, to the USB memory 8. In addition, in S12, the calculating process performing unit 46 calculates a new intermediate hash value by utilizing the intermediate hash value calculated in S10 and the start data 112 of the first page. This results in the calculation of the intermediate hash value from a top of the beginning data 100a to an end of the start data 112 of the first page. Note that the control unit 20 deletes the start data 112 of the first page from the RAM 26, once the intermediate hash value therefor is calculated in S12.

(Scan Process of the Target Page)

Figure 4:
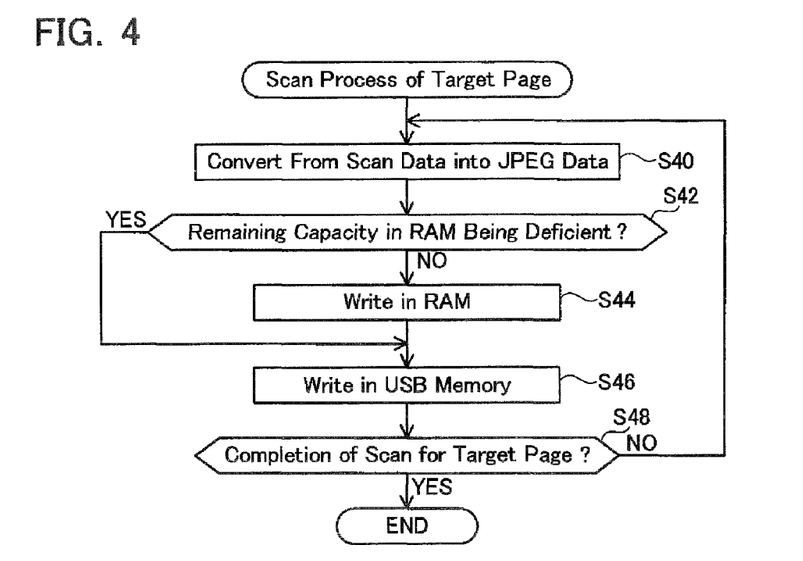
FIG. 4 shows a flowchart of a scan process of a target page.

Subsequently, in S14 the control unit 20 performs a scan process on the target page (e.g. the first page in this example). In S14 the control unit 20 first secures in the RAM 26 a storage area (hereinbelow referred to as "JPEG data creation area") that has a memory capacity of a predetermined first size. Moreover, in S14, the control unit 20 causes the scan performing unit 70 to scan the scan target object of the first page. Note that the scan performing unit 70 has a buffer (not shown) for temporarily storing the scan data in RGB bitmap format that is obtained by scanning the scan target object. The buffer has a memory capacity of a second size, which is smaller than the memory capacity of the first size (i.e. the memory capacity of the JPEG data creation area that is secured within the RAM 26). Because the second size is relatively small as the memory capacity of the buffer, not all scan data for one page can be stored in the buffer. Therefore, partial scan data is stored as a part of the scan data for one page. The part scan data within the buffer is written to the JPEG data creation area within the RAM 26. As a result, the buffer can be released so that subsequent partial scan data can be stored in the buffer. When the partial scan data is stored in the JPEG data creation area, a process of S40 shown in FIG. 4 is performed.

In a case in which beginning partial scan data of the target page (e.g. the first page) is stored in the JPEG data creation area, in S40 the original data creation unit 30 first creates the JPEG header 114a (see FIG. 2) of the first page in the JPEG data creation area. Since the scanning of the scan target object of the first page is not yet finished at this stage, the height information of the JPEG data 114 of the first page is undetermined. For this reason, the original data creation unit 30 creates the JPEG header 114a that includes predetermined virtual height information. Furthermore, in S40, the original data creation unit 30 converts the partial scan data stored in the JPEG data creation area into data in JPEG format (e.g., the partial JPEG data 114b (see FIG. 2)). Note that the partial JPEG data 114b also is created within the JPEG data creation area.

Next, in S42 the writing process performing unit 42 determines whether a remaining capacity of the RAM 26 is deficient or not. More specifically, the writing process performing unit 42 determines whether a capacity of an unused area (i.e., the remaining capacity) among areas other than the JPEG data creation area within the RAM 26 is larger than a predetermined size (e.g., a size of data to be written (e.g., a sum of the size of the JPEG header 114a and the size of the JPEG data 114b)).

Figure 5:
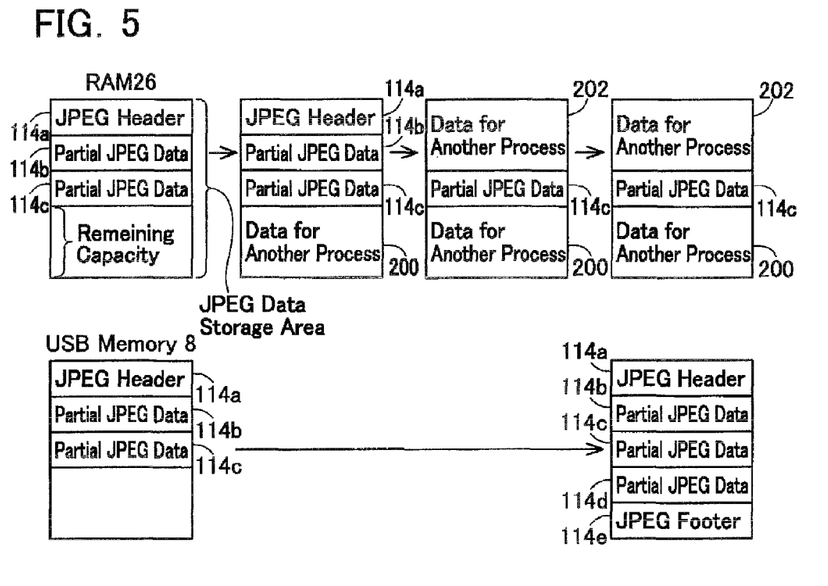
FIG. 5 shows a diagram for illustrating how data in a RAM and USB memory is changed.

When the remaining capacity of the RAM 26 is not deficient (NO in S42), then in S44 the writing process performing unit 42 writes the JPEG header 114a, which has been created in S40, to a particular area other than the JPEG data creation area within the RAM 26. Next, the writing process performing unit 42 writes the partial JPEG data 114b to the above-mentioned particular area. Note that the writing process of S44 is performed such that a first area within the RAM 26 to which the JPEG header 114a is written becomes adjacent to a second area within the RAM 26 to which the partial JPEG data 114b is written. By performing the writing process such that these areas within the RAM 26 storing the data 114a, 114b become adjacent to each other, access efficiency of accessing each of the data 114a, 114b within the RAM 26 is improved in S62 shown in FIG. 6, which is described hereinafter. The writing process performed in S44 writes the data 114a, 114b, as illustrated in the RAM 26 as shown in FIG. 5 that shows time dependent changes of contents of the RAM 26 and the USB memory 8. Once S44 is finished, the flow proceeds to S46. Note that when the remaining capacity of the RAM 26 is deficient (YES in S42), the writing process for writing the data into the RAM 26 (the process in S44) is not performed, and the flow proceeds to S46.

In S46, the writing process performing unit 42 writes the JPEG header 114a and the partial JPEG data 114b, written in S40, to the USB memory 8. As with the writing process of S44, the writing process of S46 writes the data 114a, 114b such that the areas within the USB memory 8 for storing the data 114a, 114b become adjacent to each other. As a result, access efficiency of accessing the data 114a, 114b within the USB memory 8 is improved in S64 shown in FIG. 6, which is described hereinafter. With regard to the other data 114c, 114d, 114e as well, which will be described hereinafter, the writing processes of S44 and S46 are performed thereon such that the areas for storing these data become adjacent to one another. The writing process of S46 writes the data 114a, 114b, as shown in the USB memory 8 in FIG. 5. Although not shown, once S46 is finished, the original data creation unit 30 deletes the partial scan data, the JPEG header 114a, and the partial JPEG data 114b from the JPEG data creation area. As a result, the JPEG data creation area is released so that new partial scan data is stored in the JPEG data creation area.

Next, in S48 the original data creation unit 30 determines whether the scanning of the scan target object of the first page is completed or not. Final partial scan data representing the scan target object of the first page includes information indicating that the scan target object comes at the end of the page. In a case where the processes S40 to S46 are performed on the partial scan data having such information, the original data creation unit 30 determines that a result of S48 is YES, and ends the scan process performed on the target page.

When, on the other hand, the scanning of the scan target object of the first page is not completed (NO in S48), the original data creation unit 30 performs the processes of S40 and the subsequent steps again. Accordingly, the original data creation unit 30 sequentially creates the partial JPEG data 114c, 114d (see FIG. 2). Also, the writing process performing unit 42 sequentially writes the partial JPEG data 114c, 114d to at least the USB memory 8 (when the remaining capacity is not deficient, the data are written to the RAM 26 as well). In a case where the final partial scan data of the first page is stored in the JPEG data creation area, the original data creation unit 30 creates not only the partial JPEG data 114d but also the JPEG footer 114 of the first page in S40. In this case, the writing process performing unit 42 writes not only the partial JPEG data 114d but also the JPEG footer 114e of the first page in S44 and S46.

After the scan process on the first page, all of the data 114a to 114e constituting the JPEG data 114 of the first page are written to the USB memory 8, as illustrated in the USB memory 8 shown in FIG. 5. However, not all data 114a to 114e are written to the RAM 26. This is because the data 114a and the like might not be written to the RAM 26 because it is determined in S42 of FIG. 4 that the remaining capacity of the RAM 26 is deficient. A circumstance in which the remaining capacity of the RAM 26 becomes deficient is described next.

(Print Process)

As described earlier, the RAM 26 has a memory capacity that is larger than the memory capacity for storing JPEG data for one page that has the maximum data size. Therefore, in a state in which the control unit 20 performs only the PDF file creation process shown in FIG. 3, normally a result of S42 shown in FIG. 4 is determined as NO because the remaining capacity of the RAM 26 is sufficient, and consequently all of the data 114a to 114e constituting the JPEG data 114 of the first page are written to the RAM 26. For example, there is a possibility that the print data is transmitted from the PC 6 to the multi-function device 10 while the PDF file creation process shown in FIG. 3 is performed. In this case, the particular process performing unit 50 (see FIG. 1) performs a print process, not shown, simultaneously with the PDF file creation process shown in FIG. 3 (in parallel with the PDF file creation process).

In the print process, the particular process performing unit 50 writes the print data in the RAM 26. For instance, in a case where the print process is started after the data, ranging from the JPEG header 114a of the first page to the partial JPEG data 114c, are written to the RAM 26, the particular process performing unit 50 writes print data 200 in the RAM 26, as illustrated in the RAM 26 shown in FIG. 5. As a result, the remaining capacity of the RAM 26 is decreased, and it may be determined, in the process of S42 shown in FIG. 4, that the remaining capacity of the RAM 26 is deficient.

Furthermore, when e.g. the size of the print data is comparatively large, there is a possibility that the remaining capacity of the RAM 26 becomes deficient when the particular process performing unit 50 needs to write the print data in the RAM 26. Moreover, the remaining capacity of the RAM 26 might become deficient when e.g. the particular process performing unit 50 performs a process for converting the received print data into data in particular format suitable for printing (e.g., CMYK image data). When the remaining capacity of the RAM 26 becomes deficient at the time of writing the data related to printing (the print data, the data in particular format mentioned above, etc.) in the RAM 26, the particular process performing unit 50 deletes, from the RAM 26, the data written to the RAM 26 in S44 shown in FIG. 4 (e.g., the JPEG header 114a, etc.), and thereby releases the RAM 26.

Note that, when deleting, from the RAM 26, the data written to the RAM 26 in S44 shown in FIG. 4, the particular process performing unit 50 deletes old data preferentially (data that were created previously). For example, in a state in which the data, ranging from the JPEG header 114a to the partial JPEG data 114c, are already written to the RAM 26, the particular process performing unit 50 deletes the JPEG header 114a first. When the remaining capacity still remains deficient even after this deletion, the particular process performing unit 50 further deletes the partial JPEG data 114b. When the remaining capacity still remains deficient even after this deletion, the particular process performing unit 50 further deletes the partial JPEG data 114c. As described above, the writing process for writing the data into the RAM 26 (S44 in FIG. 4) is performed such that the areas within the RAM 26 for storing the respective data 114a, 114b, 114c become adjacent to one another. Thus, preferentially deleting the old data (e.g., the data 114a) allows the remaining data (e.g., the data 114b, 114c) of the RAM 26 to become consecutive (adjacent). As a result, the access efficiency of accessing the data within the RAM 26 is improved in S62 shown in FIG. 6, which is described hereinafter.

Moreover, preferentially deleting the JPEG header 114a accomplishes the following effects. In S18 of FIG. 3, which is described hereinafter, a height information changing process is performed on the JPEG header 114a. However, the height information changing process is not performed on the data other than the JPEG header 114a, such as the partial JPEG data 114b, 114c. Because the JPEG header 114a that needs to be subjected to the changing process of S18 of FIG. 3 is preferentially deleted, the changing process of S18 of FIG. 3 does not have to be actually performed; thereby the acceleration of the processes can be realized.

The particular process performing unit 50 writes the data to be printed (the print data, the data in particular format mentioned above, etc.) to the areas within the RAM 26 to which the deleted data (e.g., the JPEG header 114a, the partial JPEG data 114b) are written. Accordingly, data 202 to be printed is written to the RAM 26, as illustrated in the RAM 26 shown in FIG. 5. Even in this state, it is determined, in the process of S42 shown in FIG. 4, that the remaining capacity of the RAM 26 is deficient.

(Height Information Changing Process)

Once the scan process on the target page (e.g., the first page) in S14 shown in FIG. 3 is finished, the flow proceeds to S16 shown in FIG. 3. As described above, the height information included in the JPEG header 114a of the first page created in S40 of FIG. 4 is the virtual height information. From S16 to S20 shown in FIG. 3, the changing unit 44 (see FIG. 1) performs a process for changing the virtual height information of the JPEG header 114a.

In S16, the changing unit 44 determines whether the height information of the first page exists within the RAM 26 or not. When the JPEG header 114a of the first page exists within the RAM 26, the changing unit 44 determines a result of S16 as YES, and proceeds to S18. On the other hand, there is a possibility that the particular process performing unit 50 mentioned above deletes the JPEG header 114a of the first page from the RAM 26 (see the RAM 26 shown in FIG. 5), while e.g. the scan process of the first page (see FIG. 4) is performed. In this case, since the JPEG header 114a of the first page does not exist within the RAM 26, the changing unit 44 determines the result of S16 as NO, and skips S18 to proceed to S20.

In S18, the changing unit 44 changes the virtual information included in the JPEG header 114a of the first page in the RAM 26, to actual height information of the JPEG data 114 of the first page. Note that the changing unit 44 can obtain the actual height information (a total number of pixels in the height direction of each of the partial JPEG data 114b to 114d) based on a result of scanning performed by the scan performing unit 70. Specifically, the scanning by the scan performing unit 70 detects a front end position and rear end position of the scan target object of the first page in the scanning direction (i.e. the direction of movement of the image sensors, the direction in which the original document is fed by the ADF). The changing unit 44 then calculates the actual height information based on these front end and the rear end positions. In addition, in S20 the changing unit 44 changes the virtual height information included in the JPEG header 114*a* of the first page in the USB memory 8, to the actual height information of the JPEG data 114 of the first page.

(Intermediate Hash Value Calculating Process)

Figure 6:
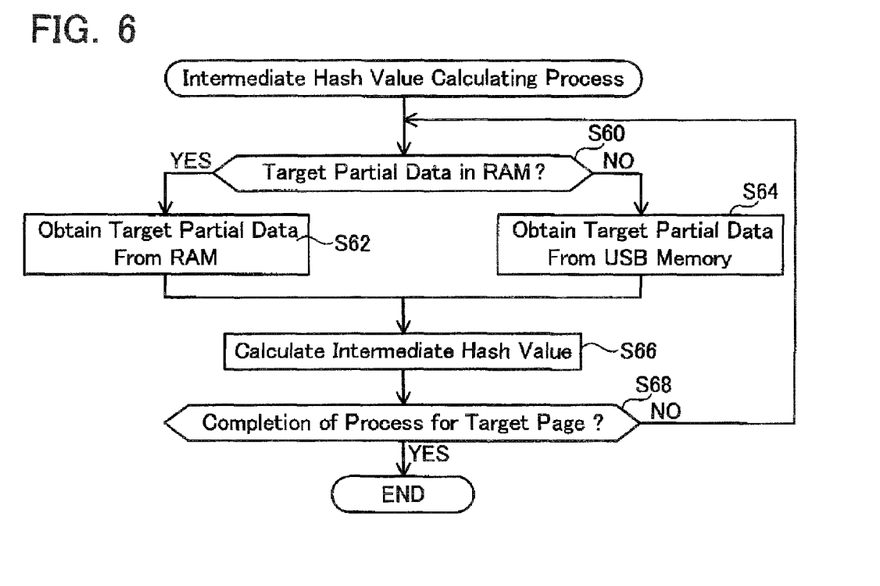
FIG. 6 shows a flowchart of an intermediate hash value calculating process that is performed up to the target page.

Once S20 is finished, in S22 the calculating process performing unit 46 performs an intermediate hash value calculating process on the target page (e.g. the first page). As shown in FIG. 6, in S60 the calculating process performing unit 46 determines whether target data used for calculating the intermediate hash value ("target partial data" hereinafter) exists within the RAM 26 or not. Note that the target partial data is the oldest data (data that is created foremost) among the data 114*a* to 114*e* constituting the JPEG data 114 of the first page, the oldest data being data that has not yet been utilized for calculating the intermediate hash value. For example, in a case where a first set of processes S60 to S66 is performed in the intermediate hash value calculating process for the first page, the target partial data corresponds to the JPEG header 114*a* of the first page. In a case where a second set of processes from S60 to S66 is performed, the target partial data corresponds to the partial JPEG data 114*b*.

In the first S60, the calculating process performing unit 46 determines whether the JPEG header 114*a* of the first page exists in the RAM 26 or not. When a result of the first S60 is YES, in S62 the calculating process performing unit 46 acquires (reads) the JPEG header 114*a* of the first page stored in the RAM 26. When, on the other hand, the result of the first S60 is NO, in S64 the calculating process performing unit 46 acquires (reads) the JPEG header 114*a* of the first page stored in the USB memory 8. More specifically, in S64 the calculating process performing unit 46 temporarily writes the JPEG header 114*a* of the first page stored in the USB memory 8, to the RAM 26.

Next, in the first S66, the calculating process performing unit 46 calculates a new intermediate hash value by utilizing the intermediate hash value calculated in S12 of FIG. 3, and the JPEG header 114*a* of the first page acquired in S62 or S64. As a result, the intermediate hash value from the top of the beginning data 100*a* (see FIG. 2) to the end of the JPEG header 114*a* of the first page is calculated. Once the first S66 is finished, in S68 the calculating process performing unit 46 utilizes the size of the JPEG data 114 of the target page (i.e., the first page) that is written to the RAM 26 and the USB memory 8, to determine whether the process on the target page is finished or not. Specifically, in the intermediate hash value calculating process (FIG. 6) preformed on the JPEG data 114 of the first page, the calculating process performing unit 46 determines a result of S68 as NO when a total size of the target partial data acquired in S62 or S64 is smaller than the size of the JPEG data 114 of the first page. When the former size matches the latter size, the calculating process performing unit 46 determines the result of S68 as YES. Note in another embodiment that the calculating process performing unit 46 determines the result of S68 as NO when the number of target partial data acquired in S62 or S64 (i.e., the number of times S62 or S64 is performed) is smaller than the number of the plurality of data 114*a* to 114*e* constituting the JPEG data 114 of the first page (the number of times S46 of FIG. 4 is performed). When the former number matches the latter number, the calculating process performing unit 46 may determine the result of S68 as YES. When the result of S68 is NO, the calculating process performing unit 46 performs the processes from S60 to S66 again for the second time for the next target partial data (the partial JPEG data 114*b* in this example).

In the second S60, the calculating process performing unit 46 determines whether the part JPEG data 114*b* exists within the RAM 26 or not. The calculating process performing unit 46 acquires the partial JPEG data 114*b* of the RAM 26 (S62) when the result of the second S60 is YES, and acquires the partial JPEG data 114*b* of the USB memory 8 when the result of the second S60 is NO. Next, in the second S66 the calculating process performing unit 46 calculates a new intermediate hash value by utilizing the intermediate hash value calculated in the first (i.e., the previous) S66 and the partial JPEG data 114*b* acquired in S62 or S64. As a result, the intermediate hash value from the top of the beginning data 100*a* (see FIG. 2) to the end of the partial JPEG data 114*b* is calculated.

As with the processes described above, a third and subsequent sets of processes S60 to S66 are performed for each of the unprocessed partial JPEG data included in the PDF data for the first page that is to be the subsequent target partial data. This results in the calculation of the intermediate hash value from the top of the beginning data 100*a* (see FIG. 2) to the end of the JPEG footer 114*e* of the first page. In this case, the result in S68 is determined as YES, and consequently the intermediate hash value calculating process for the target page (i.e., the first page) is finished. Although not shown, once the intermediate hash value calculating process is finished, the control unit 20 deletes all of the JPEG data existing in the RAM 26. Consequently, the RAM 26 is released so that the JPEG data of a next target page (e.g. a second page in this example) can be written to the RAM 26.

Note that, when performing S66 through S62 shown in FIG. 6 (when utilizing the target partial data in the RAM 26), the calculating process performing unit 46 can calculate the intermediate hash value more quickly than in the case of performing S66 through S64 shown in FIG. 6 (when utilizing the target partial data in the USB memory 8). This is because S64 shown in FIG. 6 requires a process for temporarily writing the target partial data of the USB memory 8 to the RAM 26, which is time-consuming. In order to calculate the intermediate hash value quickly, in the intermediate hash value calculating process shown in FIG. 6, the calculating process performing unit 46 calculates the intermediate hash value by preferentially utilizing the target partial data of the RAM 26 when the target partial data is stored in both the RAM 26 and the USB memory 8 (when the result of S60 is YES).

Figure 7A:
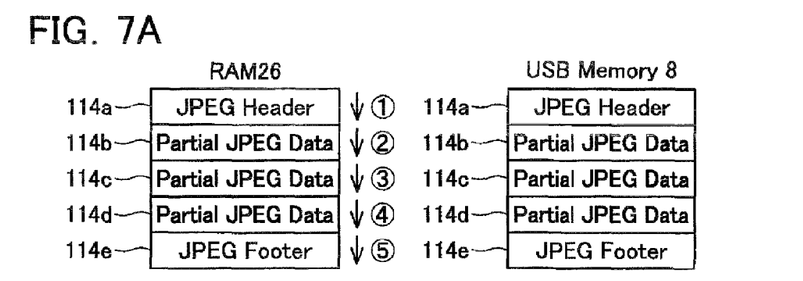
FIG. 7 shows a diagram for illustrating details of the intermediate hash value calculating process.

For instance, as shown in FIG. 7A, in a state in which all of the data 114*a* to 114*e* constituting the JPEG data 114 of the first page are stored in both the RAM 26 and the USB memory 8, the calculating process performing unit 46 calculates the intermediate hash value sequentially, by sequentially utilizing the data 114*a* to 114*e* of the RAM 26 in the order of numbers shown in FIG. 7A.

Figure 7B:
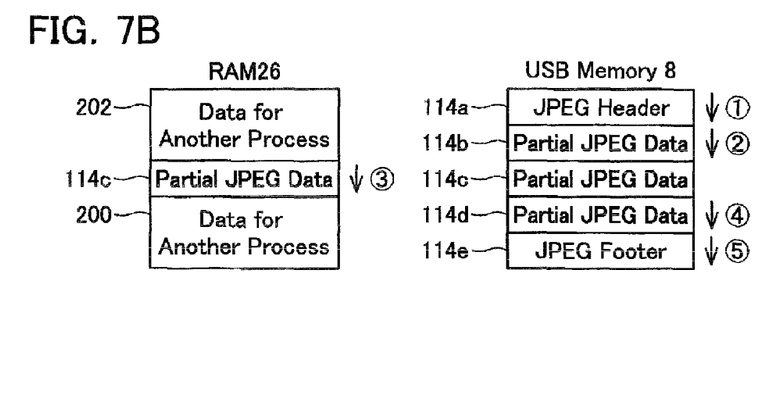

Moreover, as shown in FIG. 7B, for example, in a state in which only the partial data 114*c* constituting the JPEG data 114 of the first page is stored in both the RAM 26 and the USB memory 8, the calculating process performing unit 46 sequentially calculates the intermediate hash value, by sequentially utilizing the data 114*a* to 114*e* in either the RAM 26 or the USB memory 8 in the order of numbers shown in FIG. 7B. In other words, in the example shown in FIG. 7B, the calculating process performing unit 46 first sequentially calculates the intermediate hash value by sequentially utilizing the data 114*a*, 114*b* of the USB memory 8, and then calculates the intermediate hash value by utilizing the data 114*c* of the RAM 26. Subsequently, the calculating process performing unit 46 sequentially calculates the intermediate hash value by sequentially utilizing the data 114d, 114e of the USB memory 8.

Once the intermediate hash value calculating process for the target page (i.e., the first page) in S22 of FIG. 3 is finished, the flow proceeds to S24. In S24, the document data creation unit 40 creates the end data 116 of the first page (see FIG. 2) in the RAM 26. Furthermore, in S24, the writing process performing unit 42 writes the end data 116, which has been created in the RAM 26, to the USB memory 8. In addition, in S24, the calculating process performing unit 46 calculates a new intermediate hash value by utilizing the intermediate hash value calculated in S22 (the intermediate hash value from the top of the beginning data 100a (see FIG. 2) to the end of the JPEG footer 114e of the first page), and the end data 116 of the first page. This results in the calculation of the intermediate hash value from the top of the beginning data 100a to the end of the end data 116 of the first page. Note that the control unit 20 deletes the end data 116 of the first page from the RAM 26, once the intermediate hash value is calculated in S24.

Subsequently, in S26 the control unit 20 determines whether the scanning of the scan target objects on all pages is finished or not. More specifically, the control unit 20 determines a result of S26 as NO when new partial scan data is stored in the JPEG data creation area of the RAM 26, and determines the result of S26 as YES when no new partial scan data is stored in the JPEG data creation area.

When the result of S26 is NO, the control unit 20 performs a second set of the processes S12 to S24 again, with the target page as a subsequent page (the second page in this example). The second set of the processes S12 to S24 is same as the first set of the processes S12 to S24. As a result of the second set of the processes S12 to S24, start data 122 of the second page, JPEG data 124 of the second page, and end data 126 of the second page are written into the USB memory 8, as shown in FIG. 2. In addition, the intermediate hash value from the top of the beginning data 100a to an end of the end data 126 of the second page is calculated.

When the result of S26 is YES, in S28 the document data creation unit 40 creates a footer for the PDF file 100 in the RAM 26. Furthermore, in S28 the calculating process performing unit 46 calculates the final hash value by utilizing the intermediate hash value calculated in the last S24 (e.g., the second S24 when the number of total pages of the scan target objects is "2"), and the footer of the PDF file 100. As a result, the final hash value from the top of the beginning data 100a to an end of the footer is calculated. In S28, moreover, the signature value creation unit 48 (see FIG. 1) creates the signature value (i.e., a signed hash value) by encrypting the final hash value utilizing a predetermined secret key. In addition, in S28 the document data creation unit 40 creates the final data 100b (see FIG. 2) including the footer of the PDF file 100, the signature value, and a predetermined certificate. The signature value and the certificate are not the targets utilized for calculating the final hash value (the target to be hashed). In S28, the writing process performing unit 42 writes the final data 100b to the USB memory 8. As a result, the PDF file 100 shown in FIG. 2 is completed in the USB memory 8.

(Processes of an External Device)

The user can carry the USB memory 8 that includes the PDF file 100. The user can display the PDF file 100 of the USB memory 8 on a display unit of an external device by mounting the USB memory 8 to a USB interface of the external device (such as the PC 6) other than the multi-function device 10. In so doing, the external device can calculate the hash value from the top of the beginning data 100a to the end of the footer of the final data 100b ("first hash value" hereinafter). In addition, the external device can create a hash value by decoding the signature value included in the final data 100b by utilizing the public key included in the final data 100b ("second hash value" hereinafter). The external device can also compare the first hash value with the second hash value to determine whether there is a possibility that the PDF file 100 has been altered. For instance, when the first hash value does not match the second hash value, the external device displays on the display unit a message that explains that the PDF file 100 is likely to be altered. The user can view this message to find out that the PDF file 100 is likely to have been altered.

The communication system 2 of the embodiment is described above in detail. In the scan process performed on the target page (see FIG. 4) in S14 shown in FIG. 3, the multi-function device 10 writes the plurality of data 114a to 114e constituting the JPEG data 114 for one page, to at least the USB memory 8 (S46 in FIG. 4). Therefore, the multi-function device 10 can calculate the intermediate hash value by utilizing each of the plurality of data 114a to 114e within the USB memory 8. However, the calculation of the intermediate hash value by utilizing the data 114a etc. of the USB memory 8, as described above, requires a comparatively long period of time. Thus, in the present embodiment, the multi-function device 10 writes the data 114a etc. to not only the USB memory 8 but also the RAM 26, (S44 in FIG. 4) so that the intermediate hash value can be calculated utilizing the data 114a etc. of the RAM 26.

However, in S18 and S20 shown in FIG. 3, the multi-function device 10 changes the virtual height information included in the JPEG header 114a of the first page to the actual height information. As described earlier, the actual height information of the JPEG data 114 of the first page is undetermined until the scanning of the scan target object of the first page is finished. Therefore, after the scan process on the first page (S14 in FIG. 3) is finished, the multi-function device 10 changes the height information included in the JPEG header 114a of the first page. Moreover, of the data 114a to 114e constituting the JPEG data 114 of the first page, the data to be utilized first in order to create the intermediate hash values is the JPEG header 114a. Thus, until the height information included in the JPEG header 114a of the first page is changed, or until the scan process on the first page (S14 in FIG. 3) is finished, the multi-function device 10 cannot utilize the data 114a to 114e constituting the JPEG data 114 of the first page to calculate the intermediate hash values. However, due to the comparatively small memory capacity of the RAM 26 of the multi-function device 10 (smaller than that of the PC 6 etc.), when, for example, the print process is performed simultaneously, there is a possibility that not all of the data 114a to 114e are written to the RAM 26 (see the RAM 26 shown in FIG. 5).

For this reason, when the remaining capacity of the RAM 26 is not deficient (NO in S42 shown in FIG. 4), the multi-function device 10 writes the data 114a etc. to both the USB memory 8 and the RAM 26. When, however, the remaining capacity of the RAM 26 is deficient (YES in S42 shown in FIG. 4), the multi-function device 10 writes the data 114a etc. to the USB memory 8 only. In other words, as long as the remaining capacity of the RAM 26 does not become deficient, the multi-function device 10 can select to write the data 114a etc. to the RAM 26 as well as to the USB memory 8. Further in other words, in the case where the remaining capacity of the RAM 26 is deficient, the multi-function device 10 selectively writes the data 114a etc. to the USB memory 8. As a result, the intermediate hash value can be calculated by utilizing the data 114a etc. of the RAM 26, even when the memory capacity of the RAM 26 is comparatively small. According to the technology of the present embodiment, the intermediate hash value can be calculated more quickly than in the case where the data 114a to 114e are not written to the RAM 26 (i.e., the case where the writing process is performed only on the USB memory 8). As a result, the final hash value and signature value can also be calculated quickly, and the PDF file 100 can be created quickly.

The multi-function device 10 is an example of the "scanner device." The USB memory 8, the RAM 26, and the USB interface 16 are examples of the "external storage device," the "internal storage device," and the "unit to which the external storage device is mounted," respectively. The JPEG data 114 and 124 of the first page and the second page (see FIG. 2) are examples of the "original data for one or more pages." For example, the JPEG data 114 of the first page, and the plurality of data 114a to 114e constituting this JPEG data 114 are examples of the "original data for one page," and the "plurality of partial data," respectively. The final hash value that is calculated in S28 shown in FIG. 3 is an example of the "digest value." The data to be written in S44 and S46 shown in FIG. 4, and the target partial data acquired in S62 and S64 shown in FIG. 6 are examples of the "first type of target partial data" and the "second type of target partial data," respectively. The JPEG header 114a and the height information are examples of the "specific partial data" and the "size information," respectively. In addition, the print process and the data to be printed are examples of the "particular process" and the "particular data," respectively.

(Modification 1)

In the foregoing embodiment, the calculating process performing unit 46 creates the "digest value" by utilizing a hashing method, but another digesting method can be utilized. Generally speaking, methods for calculating "digest value" include a variety of digesting methods for creating a value that can be obtained from the original data for one or more pages, the value having a data size smaller than a total data size of the original data for one or more pages.

(Modification 2)

In the foregoing embodiment, the document data creation unit 40 creates the "document data" in PDF, but may instead create the "document data" in a format other than PDF (such as an XPS). In addition, in the embodiment described above, the original data creation unit 30 creates the "original data" in JPEG, but may instead create the "original data" in a format other than JPEG (such as a TIFF or BMP).

(Modification 3)

In the foregoing embodiment, the USB memory 8 is utilized as the "external storage device." However, "the external storage device" may instead be a hard disk embedded in the multi-function device 10, a medium such as a CD, DVD and floppy disk (registered trade mark) that can be mounted to the multi-function device 10, or a storage device within an external device (e.g., a server) that is constituted separately from the multi-function device 10.

(Modification 4)

In the foregoing embodiment, when the data to be printed it to be written to the RAM 26 as shown by the RAM 26 in FIG. 5, the particular process performing unit 50 deletes the JPEG header 114a preferentially among the data 114a to 114c. Instead of utilizing this structure, the particular process performing unit 50 may preferentially delete the partial JPEG data 114b and 114c in place of the JPEG header 114a.

(Modification 5)

In the foregoing embodiment, when the remaining capacity of the RAM 26 is deficient, the particular process performing unit 50 performs the data deletion in units of the data 114a to 114e, as shown by the RAM 26 in FIG. 5. In other words, the particular process performing unit 50 performs the data deletion in units of the data written individually to the RAM 26 in S44 of FIG. 4. Instead, the particular process performing unit 50 may delete the data in units smaller or larger than those of the data 114a to 114e. For example, when the remaining capacity of the RAM 26 is deficient, the particular process performing unit 50 may delete only partial data included in the data 114a. When the remaining capacity still remains deficient even after this deletion, the particular process performing unit 50 may delete other data included in the data 114a. In addition, for example, when the remaining capacity of the RAM 26 is deficient, the particular process performing unit 50 may delete the data 114a and the data 114b simultaneously. When the remaining capacity still remains deficient even after this deletion, the particular process performing unit 50 may delete the data 114c and the data 114d simultaneously. Generally speaking, "a part of the original data for the one page" may be the same unit as or different from the "partial data."

(Modification 6)

In the foregoing embodiment, the units of the data acquired in S62 or S64 of FIG. 6 are same as the units of the individual data written to the RAM 26 in S44 shown in FIG. 4. Instead, the calculating process performing unit 46 may perform the acquisition processes of S62, S64 shown in FIG. 6 in units smaller or larger than those of the data 114a to 114e. The structure of the present modification also is included in the configuration in which "sequentially perform a calculating process . . . by sequentially utilizing each of the plurality of partial data . . . ."

(Modification 7)

In the foregoing embodiment, the print process is an example of the "particular process," but the "particular process" may be another process. For instance, the particular process performing unit 50 may create data representing a WEB page, in response to an access from the external device, and then perform a process for transmitting the data to the external device (an example of the "particular process"). In the present modification, the data representing a WEB page is an example of the "particular data."

(Modification 8)

In the foregoing embodiment, in S18 and S20 shown in FIG. 3, the changing unit 44 changes the height information included in the header of the original data for one page. Instead, the changing unit 44 may change other information, such as the width information, scanning resolution, and total data size.

(Modification 9)

In the foregoing embodiment, respective units 30 to 50 are realized as a result of the control unit 20 performing the processes according to the program. Nevertheless, at least one unit of respective units 30 to 50 may alternately be realized by a hardware resource such as a logic circuit.

The invention claimed is:

1. A scanner device utilizing an external storage device, the scanner device comprising:
   an internal storage device;
   an original data creation unit configured to create original data for one or more pages representing a scan target object which has been scanned; and
   a document data creation unit configured to calculate a digest value utilizing the original data for the one or more pages so as to create document data in the external storage device utilizing the original data for the one or more pages and the digest value,
   wherein the document data creation unit comprises:
   a writing process performing unit configured to perform, for each of a plurality of partial data constituting original data for one page included in the original data for the one or more pages, a writing process for writing the partial data at least in the external storage device, (A1) wherein if a remaining capacity in the internal storage device is not deficient in the writing process for writing a first type of target partial data which is partial data of a target of the writing process, the writing process performing unit writes the first type of target partial data in both of the internal storage device and the external storage device, and (A2) wherein if the remaining capacity in the internal storage device is deficient in the writing process for writing the first type of target partial data, the writing process performing unit writes the first type of target partial data only in the external storage device;

a changing unit configured to change specific partial data included in the plurality of partial data after a completion of a plurality of writing processes for the plurality of partial data, wherein the writing process for the specific partial data is performed prior to the writing process for another partial data included in the plurality of partial data; and a calculating process performing unit configured to sequentially perform a calculating process for calculating the digest value by sequentially utilizing each of the plurality of partial data including the changed specific partial data, (B1) wherein if a second type of target partial data which is partial data of a target of the calculating process is stored in both of the internal storage device and the external storage device, the calculating process performing unit performs the calculating process by utilizing the second type of target partial data being stored in the internal storage device, and (B2) wherein if the second type of target partial data is stored only in the external storage device, the calculating process performing unit performs the calculating process by utilizing the second type of target partial data being stored in the external storage device.

2. The scanner device as in claim 1, wherein the specific partial data is partial data including a header portion of the original data for the one page.

3. The scanner device as in claim 2, wherein the changing unit changes the specific partial data, after a completion of scanning of the scan target object for one page, by writing size information of the scan target object for the one page in the header portion included in the specific partial data, the size information being related to a size along a scanning direction of the scan target object for the one page.

4. The scanner device as in claim 1, further comprising:
a particular process performing unit configured to write particular data in the internal storage device so as to perform a particular process which is different from the writing process, when the particular process is to be performed between a start of the plurality of writing processes for the plurality of partial data constituting the original data for the one page and a completion of the plurality of writing processes.

5. The scanner device as in claim 4, wherein
if the remaining capacity in the internal storage device is deficient when the particular data is to be written in the internal storage device, the particular process performing unit writes the particular data in a partial area in the internal storage device, the partial area being an area in which a part of the original data for the one page has been written.

6. The scanner device as in claim 1, wherein
the document data creation unit further comprises a signature value creation unit configured to create a signature value by encrypting the digest value, and
the document data creation unit creates the document data including both of the original data for the one or more pages and the signature value in the external storage device.

7. The scanner device as in claim 1, further comprising:
a unit to which the external storage device is mounted.

8. A scanner device utilizing an external storage device, the scanner device comprising:
an internal storage device; and
a computer, wherein the computer is configured to function, in accordance with computer readable instructions, as:
an original data creation unit configured to create original data for one or more pages representing a scan target object which has been scanned; and
a document data creation unit configured to calculate a digest value utilizing the original data for the one or more pages so as to create document data in the external storage device utilizing the original data for the one or more pages and the digest value,
wherein the document data creation unit comprises:
a writing process performing unit configured to perform, for each of a plurality of partial data constituting original data for one page included in the original data for the one or more pages, a writing process for writing the partial data at least in the external storage device,
(A1) wherein if a remaining capacity in the internal storage device is not deficient in the writing process for writing a first type of target partial data which is partial data of a target of the writing process, the writing process performing unit writes the first type of target partial data in both of the internal storage device and the external storage device, and
(A2) wherein if the remaining capacity in the internal storage device is deficient in the writing process for writing the first type of target partial data, the writing process performing unit writes the first type of target partial data only in the external storage device;
a changing unit configured to change specific partial data included in the plurality of partial data after a completion of a plurality of writing processes for the plurality of partial data, wherein the writing process for the specific partial data is performed prior to the writing process for another partial data included in the plurality of partial data; and
a calculating process performing unit configured to sequentially perform a calculating process for calculating the digest value by sequentially utilizing each of the plurality of partial data including the changed specific partial data,
(B1) wherein if a second type of target partial data which is partial data of a target of the calculating process is stored in both of the internal storage device and the external storage device, the calculating process performing unit performs the calculating process by utilizing the second type of target partial data being stored in the internal storage device, and
(B2) wherein if the second type of target partial data is stored only in the external storage device, the calculating process performing unit performs the calculating process by utilizing the second type of target partial data being stored in the external storage device.

* * * * *